United States Patent [19]

Watanabe et al.

[11] Patent Number: 4,721,078

[45] Date of Patent: Jan. 26, 1988

[54] LPG FUEL SHUTOFF SYSTEM

[75] Inventors: Toru Watanabe; Katuya Miyata, both of Kariya, Japan

[73] Assignee: Kabushiki Kaisha Toyoda Jidoshokki Seisakusho, Kariya, Japan

[21] Appl. No.: 862,756

[22] Filed: May 13, 1986

[30] Foreign Application Priority Data

May 24, 1985 [JP] Japan ................. 60-110217

[51] Int. Cl.⁴ .................................... F02B 77/00
[52] U.S. Cl. ...................... 123/198 DB; 123/529; 123/525
[58] Field of Search ............ 123/529, 525, 198 DB, 123/198 D, 179 G

[56] References Cited

U.S. PATENT DOCUMENTS

| 3,710,770 | 1/1973 | Newkirk et al. | 123/529 |
| 4,077,381 | 3/1978 | Firey | 123/179 G |
| 4,144,862 | 3/1979 | Estkowski | 123/198 D |
| 4,383,507 | 5/1983 | Powell | 123/180 AC |
| 4,433,664 | 2/1984 | Rodrigues | 123/529 |
| 4,648,364 | 3/1987 | Willis | 123/198 D |

Primary Examiner—E. Rollins Cross
Attorney, Agent, or Firm—Brooks Haidt Haffner & Delahunty

[57] ABSTRACT

The present invention relates to a system for shutting off the LPG fuel supply route in a vehicle except in case of necessity. Namely, when an engine is stopped and a starting switch is in switched off, a solenoid valve is operated to shut off the LPG fuel supply route to prevent the LPG fuel from leaking out to the carburetor and to keep the vehicle from suddenly lurching out.

2 Claims, 4 Drawing Figures

LPG FUEL SHUTOFF SYSTEM

BACKGROUND OF THE INVENTION

This invention relates to a vehicle driven by an engine using LPG (liquefied petroleum gas) as fuel, and more particularly to a system to shut off the supply route of the LPG fuel to the engine except when the engine is operating.

In FIG. 1, a typical prior-art fuel system for vehicles exclusively using LPG fuel is shown schematically. As shown in FIG. 1, the LPG fuel flows under pressure from an LPG tank 1 through a filter 2 into a regulator 3, where it is then decompressed to be vaporized, and this vaporized fuel is sucked in the engine 6 from a sow LPG hose 4 through a carburetor 5. A solenoid valve 7 is interposed in the LPG supply route between the LPG tank 1 and the regulator 3. This valve 7 can be opened and closed by manipulating a fuel switch 11 on an instrument panel after turning an ignition switch 10 on, whereby the LPG fuel can be supplied or cut off.

In the above described conventional fuel system, there is a danger that the LPG fuel may, under its own vapor pressure, flow toward the engine 6 and escape from the carburetor 5 to the outside through the air cleaner in spite of the engine being stopped, because the solenoid valve 7 opens when both the ignition switch 10 and the fuel switch 11 are turned on. Further, if the temperatures in the combustion chambers of the engine 6 are higher than the spontaneous combustion temperature of the LPG, the engine 6 may start by the ignition switch 10 only being switched on while the fuel switch 11 is also switched on and hence the vehicle may suddenly lurch out.

SUMMARY OF THE INVENTION

It is therefore a principal object of the present invention to eliminate the aforementioned problems of the prior art.

The above object and other objects of the present invention are accomplished by an LPG fuel shutoff system which is used for a vehicle having an LPG fuel engine and having a solenoid valve for supplying and shutting off the LPG fuel, the LPG fuel shutoff system including a first means for detecting a condition of a starting switch, and a second means for detecting a condition of the engine, whereby, when the first means detects the switching off of the starting switch and the second means detects the stopped condition of the engine, a solenoid coil of the solenoid valve is cut off from a battery so that the valve cannot open.

EMBODIMENT OF THE PRESENT INVENTION

Figure 2:
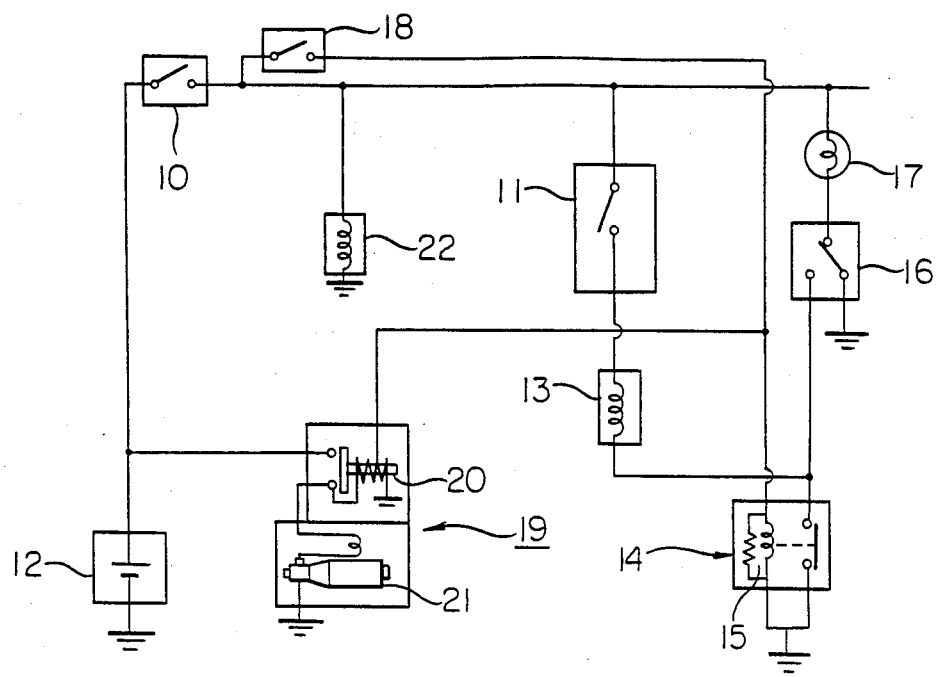
FIG. 2 is a schematic circuit diagram showing an embodiment of an LPG fuel shutoff system in accordance with the present invention.

In FIG. 2, there is shown a preferred embodiment of an LPG fuel shutoff system in accordance with the present invention.

Figure 1:
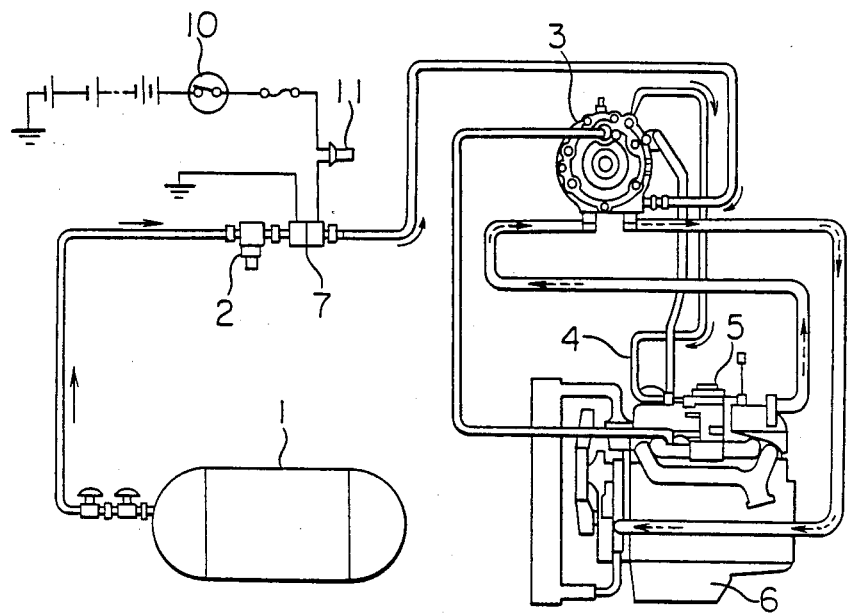
FIG. 1 is a schematic drawing of a prior-art fuel system in a vehicle using ony LPG fuel.

In this embodiment, the LPG fuel shutoff system is used in a vehicle using only LPG fuel. As the fuel system to which the LPG fuel shutoff system is applied is the same as the above prior-art system, it will be seen in FIG. 1 that the supply and shutoff of the LPG fuel to the engine 6 is also controlled by the opening and closing of the solenoid valve 7 which is interposed in the LPG supply route between the LPG tank 1 and the regulator 3.

Referring to FIG. 2, one side of a battery 12 is grounded, and the other side is connected to a solenoid coil 13 of the solenoid valve 7 through the ignition switch 10 and the fuel switch 11. The other side of the solenoid coil 13 is connected to a make contact of a relay 14 and to an engine oil pressure switch 16. The relay 14 functions to connect the solenoid coil 13 to ground when the relay coil 15 is excited, and, the pressure switch 16 is adapted to connect the solenoid coil 13 to ground when the oil pressure of the engine rises from the operation of the engine 6. Preferably, such a pressure switch 16 may light an oil lamp 17 mounted on the instrument panel when the engine oil is under normal pressure, in order that a driver can be visually aware of the condition of the engine 6.

A terminal on the fuel switch side of the ignition switch 10 is connected to one side of a starting switch 18, the other side of the starting switch 18 being grounded through the coil 15 of the relay 14. Further, the relay side of the starting switch 18 is connected to a magnet switch 20 of a starter 19 so that the magnet switch 20 can be operated to send an electric current from the battery 12 to a starting motor 21 of the starter 19 when the ignition switch 10 and the starting switch 18 are switched on Further, a terminal on the fuel switch side of the ignition switch 10 is connected to a solenoid coil 22 of the carburetor 5, an ignition circuit (not shown) and the like.

In such an arrangement, the LPG fuel shutoff system according to the present invention is operated as follows:

To begin with, the ignition switch 10 and the fuel switch 11 are switched on. At this time, the relay 14 is in the open condition because the starting switch 18 is still opened, and on the other hand, the pressure switch 16 is also in the open condition because the engine 6 is not yet operating. Therefore, as an electric current is not fed to the solenoid coil 13, the solenoid valve 7 remains closed and hence the supply route of the LPG fuel is shut off.

Subsequently, while the starting switch 18 remains in the abovementioned state, the relay coil 15 becomes excited and an armature comes in contact with the relay contacts. As a result, electric current is fed to the solenoid coil 13 to open the solenoid valve 7, and therefore LPG fuel is supplied to the engine 6. Simultaneously, as the starting motor 19 operates to start the engine 6, the oil pressure of the engine rises and the pressure switch 16 becomes closed. When the driver is made aware that the engine 6 has started through the lighting out of the oil lamp 17 or from the vehicle vibration, he switches off the starting switch 18. At this time, though the relay 14 returns to an open state, the pressure switch 16 remains closed from the operating pressure of the engine 6. Consequently, the solenoid coil 13 remains excited keeping the solenoid valve 7 open that the LPG fuel is continuously supplied to the engine 6.

When the engine 6 stops because engine trouble or the like, the oil pressure of the engine drops to open the pressure switch 16, shutting off electric current to the solenoid coil 13. As a result, the solenoid valve 7 is closed, and the LPG supply route is shut off until the starting switch 18 is turned on once more.

In order to stop the engine 6, the fuel switch 11 and the ignition switch 10 are turned off to isolate the battery 12 from the solenoid coil 13, whereby the supply of LPG fuel to the engine 6 is stopped.

Figure 4:
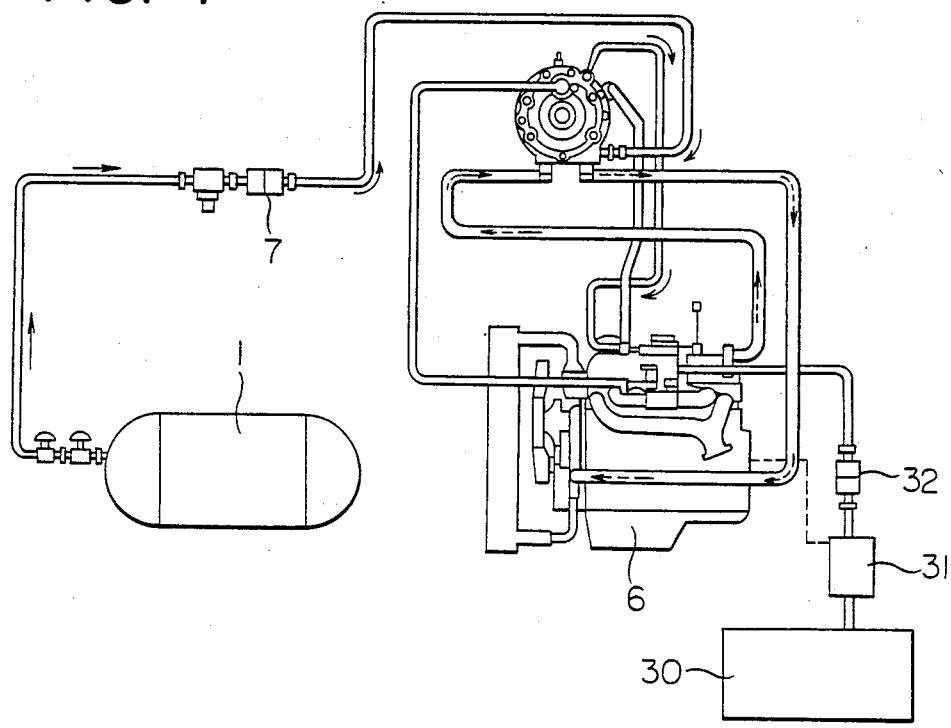
FIG. 4 is a schematic drawing of a fuel system in a vehicle using LPG fuel and gasoline.
Figure 3:
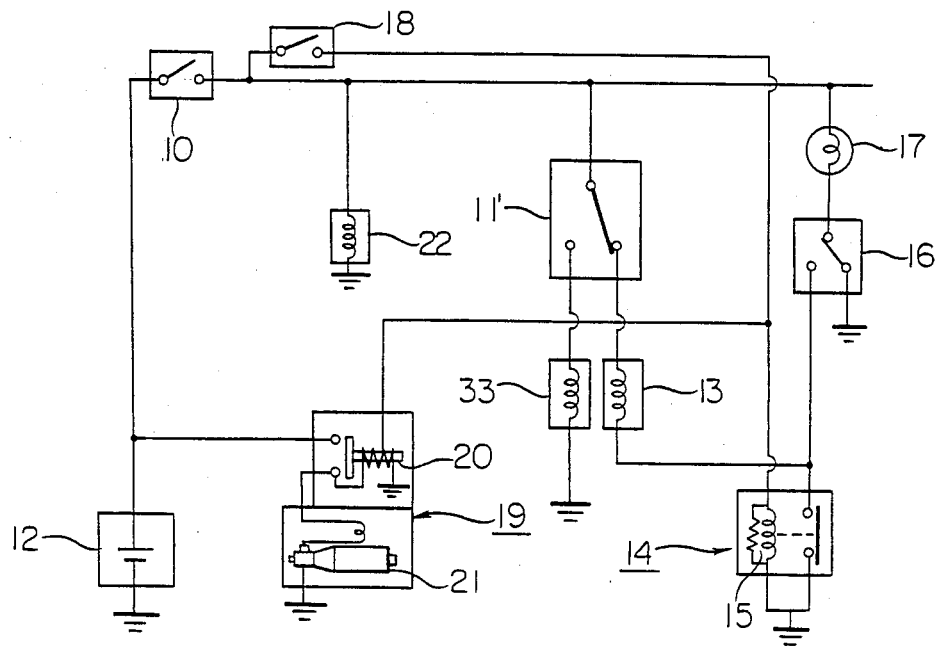
FIG. 3 is a schematic circuit diagram showing another embodiment of the present invention.

FIG. 3 shows another preferred embodiment of the LPG fuel shutoff system according to the present invention. The LPG fuel shutoff system of this embodiment is applied to an LPG-gasoline vehicle which uses selectively LPG or gasoline as fuel. As shown in FIG. 4, its fuel system includes a separate gasoline supply route from a gasoline tank 30. The gasoline supply route is adapted to supply gasoline to the engine 6 by means of a fuel pump 31 which is driven by engine 6. The selection of LPG fuel or gasoline being achieved by selectively opening solenoid valves 7 or 32 which are respectively interposed in the LPG and the gasoline supply routes. Therefore, in FIG. 3, a changeover switch, one fixed contact of which is connected to the solenoid coil 13 and the other fixed contact of which is connected to a solenoid coil 33 of the solenoid valve 32, is used as the fuel switch 11', whereby the solenoid coils 13, 33 are selectively turned on electrically. This is the only point different from the first embodiment in FIG. 1.

In the above described embodiments, the pressure switch 16 is used as a means for detecting the operating condition of the engine 6. However, such a means can be replaced by other means such as, for example a means for detecting the rotation of the output shaft of the engine 6. Also, the relay 14 is used as a means for detecting the opening and closing of the starting switch 18 but this can use a switch to mechanically cooperate with the starting switch 18. Accordingly, it should be understood that we intend to cover by the appended claims all modifications falling within the true spirit and scope of the present invention.

According to the present invention, the LPG supply route is shut off, unless the starting switch is turned on or the engine is operated. Therefore, even if the fuel switch and the ignition switch are turned on while the engine is stopped, there is no fear of the LPG fuel flowing out of the carburetor to the outside through the air cleaner, and there is no possibility of the LPG fuel flowing into the heated combustion chambers of the engine to suddenly start the engine.

What we claim is:

1. An LPG fuel shutoff system for use with a vehicle having an LPG fule engine and having a solenoid valve to supply and shut off LPG fuel, including:

a relay having a relay contact which is closed when an electric current is fed to a coil of said relay;

a pressure switch having a first position and a second position and adapted to be in said first position when engine oil pressure rises above a predetermined level;

and an oil lamp adapted to light when said engine oil pressure is below said predetermined level, and wherein a solenoid coil of said solenoid valve is connected at one side to a battery through an ignition switch and a fuel switch, said solenoid coil also being connected, at another side of said solenoid coil, in series to said relay contact and said pressure switch in said second position respectively, the coil of said relay being connected to the solenoid valve side of said ignition switch through a starting switch, said oil lamp being connected between said ignition switch and said pressure switch.

2. An LPG fuel shutoff system according to claim 1, wherein said vehicle selectively uses LPG or gasoline as fuel by selectively opening one of said solenoid valve and a second solenoid valve, said solenoid valves being respectively interposed in LPG and gasoline supply routes, and wherein said fuel switch is a changeover switch having a fixed contact connected to the solenoid coil of said solenoid valve in the LPG supply route and having another fixed contact which is connected to a solenoid coil of said second solenoid valve in the gasoline supply route.

* * * * *